(12) United States Patent
Nagaoka et al.

(10) Patent No.: US 10,388,457 B2
(45) Date of Patent: Aug. 20, 2019

(54) MULTILAYER CERAMIC CAPACITOR

(71) Applicant: TAIYO YUDEN CO., LTD., Chuo-ku, Tokyo (JP)

(72) Inventors: Kunihiko Nagaoka, Takasaki (JP); Noriyuki Chigira, Takasaki (JP)

(73) Assignee: TAIYO YUDEN CO., LTD., Tokyo (JP)

(*) Notice: Subject to any disclaimer, the term of this patent is extended or adjusted under 35 U.S.C. 154(b) by 0 days.

(21) Appl. No.: 15/655,629

(22) Filed: Jul. 20, 2017

(65) Prior Publication Data
US 2018/0040423 A1 Feb. 8, 2018

(30) Foreign Application Priority Data

Aug. 2, 2016 (JP) .................. 2016-152146

(51) Int. Cl.
*H01G 4/12* (2006.01)
*H01G 4/30* (2006.01)
*H01G 4/248* (2006.01)
*C04B 35/468* (2006.01)
*H01G 4/012* (2006.01)

(52) U.S. Cl.
CPC ....... *H01G 4/1227* (2013.01); *C04B 35/4682* (2013.01); *H01G 4/248* (2013.01); *H01G 4/30* (2013.01); *C04B 2235/3206* (2013.01); *C04B 2235/3224* (2013.01); *C04B 2235/3239* (2013.01); *C04B 2235/3262* (2013.01); *H01G 4/012* (2013.01)

(58) Field of Classification Search
CPC ...... H01G 4/1227; H01G 4/012; H01G 4/248; H01G 4/30
See application file for complete search history.

(56) References Cited

U.S. PATENT DOCUMENTS

| | | | |
|---|---|---|---|
| 9,530,564 B2 * | 12/2016 | Yao | H01G 4/30 |
| 2006/0208575 A1 * | 9/2006 | Orimo | H01G 4/0085 307/109 |
| 2008/0115876 A1 * | 5/2008 | Komatsu | C04B 35/4682 156/89.14 |
| 2010/0188797 A1 * | 7/2010 | Yamazaki | H01G 4/1227 361/303 |

(Continued)

FOREIGN PATENT DOCUMENTS

JP 2005294290 A 10/2005

*Primary Examiner* — Dion Ferguson
(74) *Attorney, Agent, or Firm* — Law Office of Katsuhiro Arai

(57) ABSTRACT

A multilayer ceramic capacitor includes: a multilayer structure in which each of a plurality of ceramic dielectric layers and each of a plurality of internal electrodes are alternately stacked and are alternately exposed to two edge faces of the multilayer structure; a first external electrode that is coupled to one of the two edge faces; and a second external electrode that is coupled to the other of the two edge faces, wherein: a main component of the plurality of ceramic dielectric layers is $BaTiO_3$; the plurality of ceramic dielectric layers include a rare earth element; and an atomic concentration ratio of a total amount of Mn and V with respect to Ti in the plurality of ceramic dielectric layers is 0.035% or more and 0.120% or less.

19 Claims, 14 Drawing Sheets

(56) References Cited

U.S. PATENT DOCUMENTS

| | | | |
|---|---|---|---|
| 2013/0194718 A1* | 8/2013 | Matsuda | H01G 4/1227 361/301.4 |
| 2014/0268489 A1* | 9/2014 | Yamaguchi | C04B 35/4682 361/301.4 |
| 2015/0036264 A1* | 2/2015 | Morita | C04B 35/4682 361/321.4 |
| 2015/0155099 A1* | 6/2015 | Nishimura | H01G 4/30 361/301.4 |
| 2016/0042866 A1* | 2/2016 | Yao | H01G 4/30 361/301.4 |
| 2016/0217931 A1* | 7/2016 | Saita | H01G 4/33 |

* cited by examiner

FIG. 4

| | ATOMIC CONCENTRATION RATIO(at %/Ti) | | | | CAPACITANCE CHANGE AFTER NO-LOAD TEST | ε | SECULAR CHANGE @ε=4000(%) | | HALT(min) | | TOTAL |
|---|---|---|---|---|---|---|---|---|---|---|---|
| | Mn | V | Mn+V | (0.035~0.12) | | | 15 OR LESS | | 500 OR MORE | | |
| EXAMPLE 1 | 0.04 | 0 | 0.04 | WITHIN RANGE | -7.8% | 3404 | 9.2 | ○ | 630 | ○ | ○ |
| EXAMPLE 2 | 0.12 | 0 | 0.12 | WITHIN RANGE | -13.3% | 3779 | 14.1 | ○ | 680 | ○ | ○ |
| EXAMPLE 3 | 0.04 | 0.01 | 0.05 | WITHIN RANGE | -12.3% | 4035 | 12.2 | ○ | 700 | ○ | ○ |
| EXAMPLE 4 | 0.1 | 0.02 | 0.12 | WITHIN RANGE | -12.5% | 3921 | 12.8 | ○ | 760 | ○ | ○ |
| EXAMPLE 5 | 0.02 | 0.015 | 0.035 | WITHIN RANGE | -18.7% | 4992 | 10.3 | ○ | 810 | ○ | ○ |
| EXAMPLE 6 | 0.05 | 0.05 | 0.1 | WITHIN RANGE | -16.9% | 4774 | 14.3 | ○ | 810 | ○ | ○ |
| EXAMPLE 7 | 0.01 | 0.06 | 0.07 | WITHIN RANGE | -20.0% | 5439 | 12.7 | ○ | 800 | ○ | ○ |
| EXAMPLE 8 | 0.02 | 0.1 | 0.12 | WITHIN RANGE | -15.1% | 4833 | 13.4 | ○ | 810 | ○ | ○ |
| EXAMPLE 9 | 0 | 0.04 | 0.04 | WITHIN RANGE | -6.5% | 4113 | 6.3 | ○ | 510 | ○ | ○ |
| EXAMPLE 10 | 0 | 0.12 | 0.12 | WITHIN RANGE | -11.0% | 3758 | 11.7 | ○ | 700 | ○ | ○ |
| COMPARATIVE 1 | 0.03 | 0.1 | 0.13 | OUT OF RANGE | -16.3% | 3850 | 16.9 | × | 670 | ○ | × |
| COMPARATIVE 2 | 0.1 | 0.03 | 0.13 | OUT OF RANGE | -22.3% | 4793 | 18.6 | × | 700 | ○ | × |
| COMPARATIVE 3 | 0.07 | 0.07 | 0.14 | OUT OF RANGE | -23.5% | 4808 | 19.6 | × | 750 | ○ | × |
| COMPARATIVE 4 | 0.075 | 0.092 | 0.167 | OUT OF RANGE | -33.0% | 5247 | 25.2 | × | 900 | ○ | × |
| COMPARATIVE 5 | 0.025 | 0 | 0.025 | OUT OF RANGE | -8.2% | 3900 | 8.4 | ○ | 180 | × | × |
| COMPARATIVE 6 | 0 | 0 | 0 | OUT OF RANGE | -6.7% | 3978 | 6.7 | ○ | 20 | × | × |
| COMPARATIVE 7 | 0.015 | 0.015 | 0.03 | OUT OF RANGE | -5.5% | 3992 | 5.5 | ○ | 440 | × | × |
| COMPARATIVE 8 | 0.14 | 0 | 0.14 | OUT OF RANGE | -18.0% | 4113 | 17.5 | × | 880 | ○ | × |
| COMPARATIVE 9 | 0 | 0.025 | 0.025 | OUT OF RANGE | -3.7% | 3971 | 3.7 | ○ | 80 | × | × |
| COMPARATIVE 10 | 0 | 0.14 | 0.14 | OUT OF RANGE | -16.2% | 3475 | 18.6 | × | 960 | ○ | × |

FIG. 5

| | ATOMIC CONCENTRATION RATIO(at %/Ti) | | | CAPACITANCE CHANGE AFTER NO-LOAD TEST | $\varepsilon$ | SECULAR CHANGE @$\varepsilon$=4000 | | HALT(min) | | TOTAL |
|---|---|---|---|---|---|---|---|---|---|---|
| | Mn | V | Mn+V (0.035~0.12) | | | | 15 OR LESS | 500 OR MORE | | |
| EXAMPLE 11 | 0.04 | 0 | 0.04 | WITHIN RANGE | -9.3% | 3356 | 9.4 | ○ | 680 | ○ | ○ |
| EXAMPLE 12 | 0.12 | 0 | 0.12 | WITHIN RANGE | -10.9% | 3770 | 12.2 | ○ | 700 | ○ | ○ |
| EXAMPLE 13 | 0.04 | 0.01 | 0.05 | WITHIN RANGE | -10.1% | 3892 | 11.5 | ○ | 750 | ○ | ○ |
| EXAMPLE 14 | 0.1 | 0.02 | 0.12 | WITHIN RANGE | -11.9% | 3873 | 12.0 | ○ | 830 | ○ | ○ |
| EXAMPLE 15 | 0.02 | 0.015 | 0.035 | WITHIN RANGE | -15.8% | 4699 | 10.5 | ○ | 780 | ○ | ○ |
| EXAMPLE 16 | 0.05 | 0.05 | 0.1 | WITHIN RANGE | -16.4% | 4711 | 13.6 | ○ | 810 | ○ | ○ |
| EXAMPLE 17 | 0.01 | 0.06 | 0.07 | WITHIN RANGE | -18.5% | 4985 | 12.1 | ○ | 850 | ○ | ○ |
| EXAMPLE 18 | 0.02 | 0.1 | 0.12 | WITHIN RANGE | -14.7% | 4785 | 12.8 | ○ | 850 | ○ | ○ |
| EXAMPLE 19 | 0 | 0.04 | 0.04 | WITHIN RANGE | -8.0% | 4110 | 9.5 | ○ | 700 | ○ | ○ |
| EXAMPLE 20 | 0 | 0.12 | 0.12 | WITHIN RANGE | -11.1% | 3857 | 9.8 | ○ | 690 | ○ | ○ |
| COMPARATIVE 11 | 0.03 | 0.1 | 0.13 | OUT OF RANGE | -16.4% | 3888 | 17.6 | × | 720 | ○ | × |
| COMPARATIVE 12 | 0.1 | 0.03 | 0.13 | OUT OF RANGE | -19.3% | 4339 | 16.5 | × | 740 | ○ | × |
| COMPARATIVE 13 | 0.07 | 0.07 | 0.14 | OUT OF RANGE | -20.5% | 4554 | 19.3 | × | 720 | ○ | × |
| COMPARATIVE 14 | 0.075 | 0.092 | 0.167 | OUT OF RANGE | -25.3% | 4990 | 21.2 | × | 850 | ○ | × |
| COMPARATIVE 15 | 0.025 | 0 | 0.025 | OUT OF RANGE | -8.2% | 3846 | 6.0 | ○ | 200 | × | × |
| COMPARATIVE 16 | 0 | 0 | 0 | OUT OF RANGE | -8.3% | 3922 | 5.5 | ○ | 40 | × | × |
| COMPARATIVE 17 | 0.015 | 0.015 | 0.03 | OUT OF RANGE | -7.8% | 4119 | 7.3 | ○ | 420 | × | × |
| COMPARATIVE 18 | 0.14 | 0 | 0.14 | OUT OF RANGE | -14.2% | 4030 | 17.4 | × | 820 | ○ | × |
| COMPARATIVE 19 | 0 | 0.025 | 0.025 | OUT OF RANGE | -5.8% | 3923 | 8.2 | ○ | 110 | × | × |
| COMPARATIVE 20 | 0 | 0.14 | 0.14 | OUT OF RANGE | -18.9% | 3437 | 16.6 | × | 880 | ○ | × |

FIG. 6

| | ATOMIC CONCENTRATION RATIO(at %/Ti) | | | | CAPACITANCE CHANGE AFTER NO-LOAD TEST | $\varepsilon$ | SECULAR CHANGE @$\varepsilon$=4000 | | HALT(min) | | TOTAL |
|---|---|---|---|---|---|---|---|---|---|---|---|
| | Mn | V | Mn+V (0.035~0.12) | | | | | 15 OR LESS | | 500 OR MORE | |
| EXAMPLE 21 | 0.04 | 0 | 0.04 | WITHIN RANGE | -9.6% | 3329 | 8.5 | ○ | 710 | ○ | ○ |
| EXAMPLE 22 | 0.12 | 0 | 0.12 | WITHIN RANGE | -12.1% | 3726 | 13.3 | ○ | 740 | ○ | ○ |
| EXAMPLE 23 | 0.04 | 0.01 | 0.05 | WITHIN RANGE | -10.7% | 3893 | 12.0 | ○ | 780 | ○ | ○ |
| EXAMPLE 24 | 0.1 | 0.02 | 0.12 | WITHIN RANGE | -11.5% | 3851 | 12.5 | ○ | 830 | ○ | ○ |
| EXAMPLE 25 | 0.02 | 0.015 | 0.035 | WITHIN RANGE | -16.4% | 4770 | 11.5 | ○ | 790 | ○ | ○ |
| EXAMPLE 26 | 0.05 | 0.05 | 0.1 | WITHIN RANGE | -15.3% | 4730 | 11.1 | ○ | 840 | ○ | ○ |
| EXAMPLE 27 | 0.01 | 0.06 | 0.07 | WITHIN RANGE | -19.2% | 5228 | 13.4 | ○ | 870 | ○ | ○ |
| EXAMPLE 28 | 0.02 | 0.1 | 0.12 | WITHIN RANGE | -15.1% | 4711 | 12.8 | ○ | 870 | ○ | ○ |
| EXAMPLE 29 | 0 | 0.04 | 0.04 | WITHIN RANGE | -8.8% | 4042 | 8.0 | ○ | 680 | ○ | ○ |
| EXAMPLE 30 | 0 | 0.12 | 0.12 | WITHIN RANGE | -11.8% | 3669 | 10.2 | ○ | 720 | ○ | ○ |
| COMPARATIVE 21 | 0.03 | 0.1 | 0.13 | OUT OF RANGE | -16.1% | 3782 | 16.5 | × | 750 | ○ | × |
| COMPARATIVE 22 | 0.1 | 0.03 | 0.13 | OUT OF RANGE | -20.9% | 4716 | 17.4 | × | 790 | ○ | × |
| COMPARATIVE 23 | 0.07 | 0.07 | 0.14 | OUT OF RANGE | -20.5% | 4737 | 20.7 | × | 750 | ○ | × |
| COMPARATIVE 24 | 0.075 | 0.092 | 0.167 | OUT OF RANGE | -29.2% | 5111 | 26.6 | × | 880 | ○ | × |
| COMPARATIVE 25 | 0.025 | 0 | 0.025 | OUT OF RANGE | -8.9% | 3830 | 7.8 | ○ | 220 | × | × |
| COMPARATIVE 26 | 0 | 0 | 0 | OUT OF RANGE | -7.5% | 3905 | 5.9 | ○ | 40 | × | × |
| COMPARATIVE 27 | 0.015 | 0.015 | 0.03 | OUT OF RANGE | -6.4% | 3932 | 6.8 | ○ | 400 | × | × |
| COMPARATIVE 28 | 0.14 | 0 | 0.14 | OUT OF RANGE | -15.0% | 4044 | 19.3 | × | 860 | ○ | × |
| COMPARATIVE 29 | 0 | 0.025 | 0.025 | OUT OF RANGE | -4.4% | 3901 | 5.2 | ○ | 110 | × | × |
| COMPARATIVE 30 | 0 | 0.14 | 0.14 | OUT OF RANGE | -18.2% | 3399 | 17.9 | × | 930 | ○ | × |

FIG. 7

| | ATOMIC CONCENTRATION RATIO(at %/Ti) | | | | CAPACITANCE CHANGE AFTER NO-LOAD TEST | ε | SECULAR CHANGE @ε=4000 | | HALT(min) | | TOTAL |
|---|---|---|---|---|---|---|---|---|---|---|---|
| | Mn | V | Mn+V (0.035~0.12) | | | | 15 OR LESS | | 500 OR MORE | | |
| EXAMPLE 31 | 0.04 | 0 | 0.04 | WITHIN RANGE | -6.6% | 3444 | 8.6 | ○ | 620 | ○ | ○ |
| EXAMPLE 32 | 0.12 | 0 | 0.12 | WITHIN RANGE | -12.0% | 3790 | 13.7 | ○ | 660 | ○ | ○ |
| EXAMPLE 33 | 0.04 | 0.01 | 0.05 | WITHIN RANGE | -10.5% | 4103 | 12.8 | ○ | 680 | ○ | ○ |
| EXAMPLE 34 | 0.1 | 0.02 | 0.12 | WITHIN RANGE | -11.2% | 3977 | 11.3 | ○ | 750 | ○ | ○ |
| EXAMPLE 35 | 0.02 | 0.015 | 0.035 | WITHIN RANGE | -16.7% | 4980 | 11.1 | ○ | 850 | ○ | ○ |
| EXAMPLE 36 | 0.05 | 0.05 | 0.1 | WITHIN RANGE | -16.2% | 4879 | 13.7 | ○ | 800 | ○ | ○ |
| EXAMPLE 37 | 0.01 | 0.06 | 0.07 | WITHIN RANGE | -18.8% | 5218 | 14.0 | ○ | 800 | ○ | ○ |
| EXAMPLE 38 | 0.02 | 0.1 | 0.12 | WITHIN RANGE | -16.4% | 4906 | 13.5 | ○ | 780 | ○ | ○ |
| EXAMPLE 39 | 0 | 0.04 | 0.04 | WITHIN RANGE | -8.0% | 4142 | 8.5 | ○ | 530 | ○ | ○ |
| EXAMPLE 40 | 0 | 0.12 | 0.12 | WITHIN RANGE | -10.1% | 3796 | 11.2 | ○ | 690 | ○ | ○ |
| COMPARATIVE 31 | 0.07 | 0.07 | 0.14 | OUT OF RANGE | -20.6% | 4831 | 18.6 | × | 740 | ○ | × |
| COMPARATIVE 32 | 0.015 | 0.015 | 0.03 | OUT OF RANGE | -7.3% | 4005 | 6.8 | ○ | 400 | × | × |

FIG. 8

| | ATOMIC CONCENTRATION RATIO(at %/Ti) | | | CAPACITANCE CHANGE AFTER NO-LOAD TEST | SECULAR CHANGE @ε=4000 | | HALT(min) | | TOTAL |
|---|---|---|---|---|---|---|---|---|---|
| | Mn | V | Mn+V (0.035~0.12) | | ε | 15 OR LESS | 500 OR MORE | | |
| EXAMPLE 41 | 0.04 | 0 | 0.04 WITHIN RANGE | -8.9% | 3410 | 8.3 ○ | 660 ○ | | ○ |
| EXAMPLE 42 | 0.12 | 0 | 0.12 WITHIN RANGE | -11.2% | 3722 | 12.0 ○ | 680 ○ | | ○ |
| EXAMPLE 43 | 0.04 | 0.01 | 0.05 WITHIN RANGE | -11.3% | 3976 | 11.4 ○ | 700 ○ | | ○ |
| EXAMPLE 44 | 0.1 | 0.02 | 0.12 WITHIN RANGE | -12.0% | 4133 | 11.6 ○ | 790 ○ | | ○ |
| EXAMPLE 45 | 0.02 | 0.015 | 0.035 WITHIN RANGE | -15.3% | 4739 | 11.1 ○ | 780 ○ | | ○ |
| EXAMPLE 46 | 0.05 | 0.05 | 0.1 WITHIN RANGE | -15.4% | 4754 | 13.3 ○ | 810 ○ | | ○ |
| EXAMPLE 47 | 0.01 | 0.06 | 0.07 WITHIN RANGE | -16.5% | 4897 | 14.0 ○ | 830 ○ | | ○ |
| EXAMPLE 48 | 0.02 | 0.1 | 0.12 WITHIN RANGE | -13.1% | 4798 | 13.2 ○ | 830 ○ | | ○ |
| EXAMPLE 49 | 0 | 0.04 | 0.04 WITHIN RANGE | -9.3% | 4135 | 8.6 ○ | 680 ○ | | ○ |
| EXAMPLE 50 | 0 | 0.12 | 0.12 WITHIN RANGE | -10.5% | 3931 | 9.2 ○ | 670 ○ | | ○ |
| COMPARATIVE 33 | 0.07 | 0.07 | 0.14 OUT OF RANGE | -18.3% | 4509 | 18.5 × | 710 ○ | | × |
| COMPARATIVE 34 | 0.015 | 0.015 | 0.03 OUT OF RANGE | -8.0% | 4037 | 8.5 ○ | 420 × | | × |

FIG. 9

| | ATOMIC CONCENTRATION RATIO(at %/Ti) | | | | CAPACITANCE CHANGE AFTER NO-LOAD TEST | ε | SECULAR CHANGE @ε=4000 | | HALT(min) | | TOTAL |
|---|---|---|---|---|---|---|---|---|---|---|---|
| | Mn | V | Mn+V (0.035~0.12) | | | | 15 OR LESS | | 500 OR MORE | | |
| EXAMPLE 51 | 0.04 | 0 | 0.04 | WITHIN RANGE | -8.8% | 3345 | 7.9 | ○ | 730 | ○ | ○ |
| EXAMPLE 52 | 0.12 | 0 | 0.12 | WITHIN RANGE | -12.4% | 3772 | 12.5 | ○ | 750 | ○ | ○ |
| EXAMPLE 53 | 0.04 | 0.01 | 0.05 | WITHIN RANGE | -11.5% | 3930 | 12.5 | ○ | 780 | ○ | ○ |
| EXAMPLE 54 | 0.1 | 0.02 | 0.12 | WITHIN RANGE | -11.1% | 3889 | 12.2 | ○ | 850 | ○ | ○ |
| EXAMPLE 55 | 0.02 | 0.015 | 0.035 | WITHIN RANGE | -16.3% | 4776 | 12.4 | ○ | 790 | ○ | ○ |
| EXAMPLE 56 | 0.05 | 0.05 | 0.1 | WITHIN RANGE | -15.7% | 4655 | 13.3 | ○ | 830 | ○ | ○ |
| EXAMPLE 57 | 0.01 | 0.06 | 0.07 | WITHIN RANGE | -18.2% | 5244 | 14.1 | ○ | 870 | ○ | ○ |
| EXAMPLE 58 | 0.02 | 0.1 | 0.12 | WITHIN RANGE | -14.6% | 4763 | 12.0 | ○ | 850 | ○ | ○ |
| EXAMPLE 59 | 0 | 0.04 | 0.04 | WITHIN RANGE | -8.8% | 4068 | 9.3 | ○ | 730 | ○ | ○ |
| EXAMPLE 60 | 0 | 0.12 | 0.12 | WITHIN RANGE | -10.2% | 3687 | 11.8 | ○ | 730 | ○ | ○ |
| COMPARATIVE 35 | 0.07 | 0.07 | 0.14 | OUT OF RANGE | -18.5% | 4753 | 18.2 | × | 770 | ○ | × |
| COMPARATIVE 36 | 0.015 | 0.015 | 0.03 | OUT OF RANGE | -8.3% | 3940 | 7.2 | ○ | 420 | × | × |

FIG. 10

| | ATOMIC CONCENTRATION RATIO(at %/Ti) | | | | | CAPACITANCE CHANGE AFTER NO-LOAD TEST | ε | SECULAR CHANGE @ε=4000 | | HALT(min) | | TOTAL |
|---|---|---|---|---|---|---|---|---|---|---|---|---|
| | Dy | Mg | Mn | V | Mn+V (0.035~0.12) | | | 15 OR LESS | | 500 OR MORE | | |
| EXAMPLE 61 | 0.5 | 0 | 0.1 | 0.02 | 0.12 | WITHIN RANGE | -11.8% | 3887 | 12.2 | ○ | 720 | ○ | ○ |
| EXAMPLE 62 | 0.5 | 0 | 0.02 | 0.015 | 0.035 | WITHIN RANGE | -16.5% | 4856 | 11.5 | ○ | 760 | ○ | ○ |
| EXAMPLE 63 | 0.5 | 0 | 0.05 | 0.05 | 0.1 | WITHIN RANGE | -17.2% | 4740 | 14.0 | ○ | 750 | ○ | ○ |
| EXAMPLE 64 | 0.5 | 0 | 0.02 | 0.1 | 0.12 | WITHIN RANGE | -13.8% | 4802 | 13.8 | ○ | 760 | ○ | ○ |
| EXAMPLE 65 | 0.5 | 0.09 | 0.1 | 0.02 | 0.12 | WITHIN RANGE | -12.3% | 3808 | 11.3 | ○ | 700 | ○ | ○ |
| EXAMPLE 66 | 0.5 | 0.09 | 0.02 | 0.015 | 0.035 | WITHIN RANGE | -15.5% | 4723 | 9.3 | ○ | 760 | ○ | ○ |
| EXAMPLE 67 | 0.5 | 0.09 | 0.05 | 0.05 | 0.1 | WITHIN RANGE | -18.1% | 4719 | 13.6 | ○ | 740 | ○ | ○ |
| EXAMPLE 68 | 0.5 | 0.09 | 0.02 | 0.1 | 0.12 | WITHIN RANGE | -14.5% | 4781 | 12.7 | ○ | 770 | ○ | ○ |
| EXAMPLE 69 | 2.8 | 0 | 0.1 | 0.02 | 0.12 | WITHIN RANGE | -12.7% | 3982 | 12.5 | ○ | 740 | ○ | ○ |
| EXAMPLE 70 | 2.8 | 0 | 0.02 | 0.015 | 0.035 | WITHIN RANGE | -13.5% | 4466 | 9.5 | ○ | 760 | ○ | ○ |
| EXAMPLE 71 | 2.8 | 0 | 0.05 | 0.05 | 0.1 | WITHIN RANGE | -14.4% | 4892 | 13.8 | ○ | 780 | ○ | ○ |
| EXAMPLE 72 | 2.8 | 0 | 0.02 | 0.1 | 0.12 | WITHIN RANGE | -13.2% | 4937 | 12.4 | ○ | 780 | ○ | ○ |
| EXAMPLE 73 | 2.8 | 0.09 | 0.1 | 0.02 | 0.12 | WITHIN RANGE | -12.3% | 3791 | 11.3 | ○ | 700 | ○ | ○ |
| EXAMPLE 74 | 2.8 | 0.09 | 0.02 | 0.015 | 0.035 | WITHIN RANGE | -15.5% | 4667 | 9.3 | ○ | 770 | ○ | ○ |
| EXAMPLE 75 | 2.8 | 0.09 | 0.05 | 0.05 | 0.1 | WITHIN RANGE | -18.1% | 4629 | 13.6 | ○ | 770 | ○ | ○ |
| EXAMPLE 76 | 2.8 | 0.09 | 0.02 | 0.1 | 0.12 | WITHIN RANGE | -14.5% | 4784 | 12.7 | ○ | 810 | ○ | ○ |

FIG. 11

| | ATOMIC CONCENTRATION RATIO(at %/Ti) | | | | | | CAPACITANCE CHANGE AFTER NO-LOAD TEST | ε | SECULAR CHANGE @ε=4000 | | HALT(min) | | TOTAL |
|---|---|---|---|---|---|---|---|---|---|---|---|---|---|
| | Dy | Ho | Mg | Mn | V | Mn+V (0.035~0.12) | | | 15 OR LESS | | 500 OR MORE | | |
| EXAMPLE 77 | 0.5 | 0.5 | 0 | 0.1 | 0.02 | 0.12 WITHIN RANGE | -11.8% | 3943 | 13.2 | ○ | 750 | ○ | ○ |
| EXAMPLE 78 | 0.5 | 0.5 | 0 | 0.02 | 0.015 | 0.035 WITHIN RANGE | -16.5% | 4440 | 10.3 | ○ | 730 | ○ | ○ |
| EXAMPLE 79 | 0.5 | 0.5 | 0 | 0.05 | 0.05 | 0.1 WITHIN RANGE | -17.2% | 4609 | 14.2 | ○ | 730 | ○ | ○ |
| EXAMPLE 80 | 0.5 | 0.5 | 0 | 0.02 | 0.1 | 0.12 WITHIN RANGE | -13.8% | 4783 | 13.7 | ○ | 710 | ○ | ○ |
| EXAMPLE 81 | 0.5 | 0.5 | 0.09 | 0.1 | 0.02 | 0.12 WITHIN RANGE | -12.3% | 3917 | 12.0 | ○ | 690 | ○ | ○ |
| EXAMPLE 82 | 0.5 | 0.5 | 0.09 | 0.02 | 0.015 | 0.035 WITHIN RANGE | -15.5% | 4639 | 8.9 | ○ | 730 | ○ | ○ |
| EXAMPLE 83 | 0.5 | 0.5 | 0.09 | 0.05 | 0.05 | 0.1 WITHIN RANGE | -18.1% | 4204 | 13.5 | ○ | 750 | ○ | ○ |
| EXAMPLE 84 | 0.5 | 0.5 | 0.09 | 0.02 | 0.1 | 0.12 WITHIN RANGE | -14.5% | 4636 | 12.4 | ○ | 760 | ○ | ○ |

MULTILAYER CERAMIC CAPACITOR

CROSS-REFERENCE TO RELATED APPLICATION

This application is based upon and claims the benefit of priority of the prior Japanese Patent Application No. 2016-152146, filed on Aug. 2, 2016, the entire contents of which are incorporated herein by reference.

FIELD

A certain aspect of the present invention relates to a multilayer ceramic capacitor.

BACKGROUND

In order to downsize a multilayer ceramic capacitor and enlarge a capacitance of the multilayer ceramic capacitor, a thickness of a dielectric layer is being reduced and a material having a high dielectric constant (c) is being developed. When the thickness is reduced, reliability may be degraded. A capacitance of the material having the high dielectric constant may be secularly changed.

Japanese Patent Application Publication No. 2005-294290 (hereinafter referred to as Document 1) discloses the following dielectric material. There is disclosed a dielectric material which includes $BaTiO_3$ as a main component, includes more than 0 mol and less than 0.1 mol of a first subcomponent including at least one of MgO, CaO, BaO and SrO, and includes more than 1 mol and less than 7 mol of a second subcomponent of oxide of R (R is at least one of Y, Dy, Ho and Er), and has crystal grains structuring a dielectric layer of which average grain diameter is 0.25 μm or more and 0.42 μm or less.

Moreover, Document 1 discloses that the dielectric material includes more than 0 mol and less than 5 mol of $CaZrO_3$ or $CaO+ZrO_2$ as a third subcomponent, includes a sintering additive having a main component of silicon oxide as a fourth subcomponent, includes more than 0 mol and 0.5 mol or less of MnO or $Cr_2O_3$ as a fifth subcomponent, and includes 0.01 mol or more and 0.5 mol or less of at least one of $V_2O_5$, $MoO_3$ and $WO_3$ as a sixth subcomponent.

SUMMARY OF THE INVENTION

However, Document 1 fails to disclose a material composition for improving reliability with respect to HALT (Highly Accelerated Limit Test). And, although Document 1 discloses each amount of doped element, Document fails to disclose a mutual amount relationship of each doped element.

The present invention has a purpose of providing a multilayer ceramic capacitor having a capacitance of which secular change is small and having high reliability estimated by the HALT test.

According to an aspect of the present invention, there is provided a multilayer ceramic capacitor including: a multilayer structure in which each of a plurality of ceramic dielectric layers and each of a plurality of internal electrodes are alternately stacked and are alternately exposed to two edge faces of the multilayer structure; a first external electrode that is coupled to one of the two edge faces; and a second external electrode that is coupled to the other of the two edge faces, wherein: a main component of the plurality of ceramic dielectric layers is $BaTiO_3$; the plurality of ceramic dielectric layers include a rare earth element; and an atomic concentration ratio of a total amount of Mn and V with respect to Ti in the plurality of ceramic dielectric layers is 0.035% or more and 0.120% or less.

BRIEF DESCRIPTION OF THE DRAWINGS

FIG. 4 illustrates examples and comparative examples;
FIG. 5 illustrates examples and comparative examples;
FIG. 6 illustrates examples and comparative examples;
FIG. 7 illustrates examples and comparative examples;
FIG. 8 illustrates examples and comparative examples;
FIG. 9 illustrates examples and comparative examples;
FIG. 10 illustrates examples and comparative examples;
FIG. 11 illustrates examples and comparative examples.

DETAILED DESCRIPTION

Figure 1:
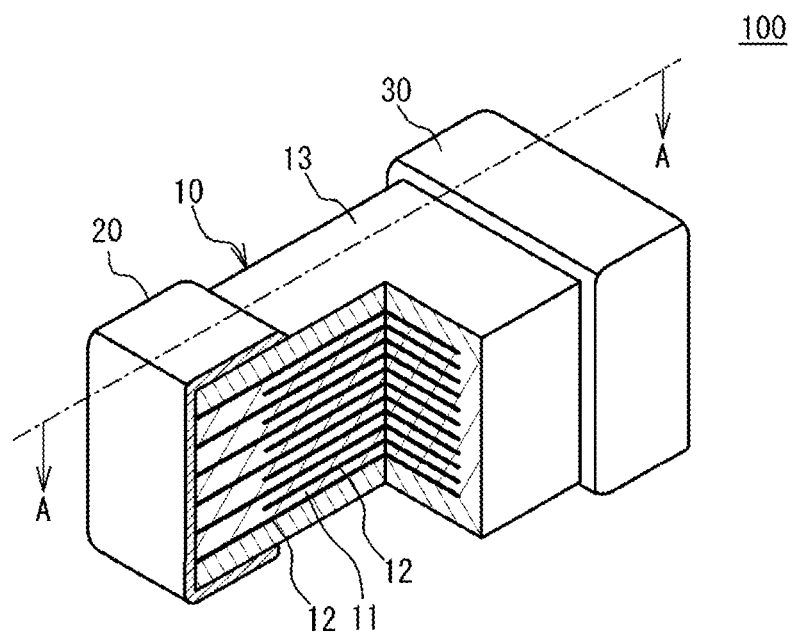
FIG. 1 illustrates a partial perspective view of a multilayer ceramic capacitor.
Figure 2:
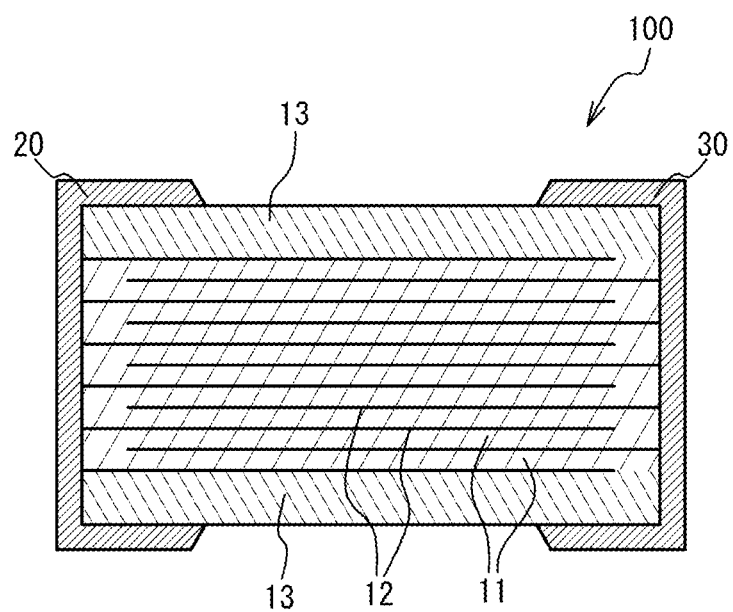
FIG. 2 illustrates a cross sectional view taken along a line A-A of FIG. 1.

A description will be given of an embodiment with reference to the accompanying drawings.
[Embodiment]
A description will be given of a multilayer ceramic capacitor. FIG. 1 illustrates a partial perspective view of a multilayer ceramic capacitor 100. FIG. 2 illustrates a cross sectional view taken along a line A-A of FIG. 1. As illustrated in FIG. 1 and FIG. 2, the multilayer ceramic capacitor 100 includes a multilayer chip 10 having a rectangular parallelepiped shape, and a pair of external electrodes 20 and 30 that are provided at edge faces of the multilayer chip 10 facing each other.

A main component of the dielectric layer 11 is barium titanate ($BaTiO_3$) having a perovskite structure. The perovskite structure includes $ABO_{3-\alpha}$ having an off-stoichiometric composition. The external electrodes 20 and 30 include metal material. A main component of the external electrodes 20 and 30 is a base metal such as nickel (Ni), copper (Cu), tin (Sn) or the like. The multilayer chip 10 has a structure in which dielectric layers 11 including ceramic material acting as a dielectric material and internal electrode layers 12 including metal material are alternately stacked. For example, a main component of the internal electrode layer 12 is a base metal such as nickel (Ni), copper (Cu), tin (Sn) or the like.

End edges of the internal electrode layers 12 are alternately exposed to a first end face of the multilayer chip 10 and a second end face of the multilayer chip 10 that is different from the first end face. In the embodiment, the first face faces with the second face. The external electrode 20 is provided on the first end face. The external electrode 30 is provided on the second end face. Thus, the internal electrode layers 12 are alternately conducted to the external electrode 20 and the external electrode 30. Thus, the multilayer ceramic capacitor 100 has a structure in which a plurality of ceramic capacitors are stacked. In the multilayer chip 10, both end faces in the stack direction of the dielectric layers 11 and the internal electrode layers 12 (hereinafter referred to as stack direction) are covered by cover layers 13. For example, material of the cover layer 13 is the same as that of the dielectric layer 11.

For example, the multilayer ceramic capacitor 100 may have a length of 0.2 mm, a width of 0.1 mm and a height of 0.3 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

In order to downsize the multilayer ceramic capacitor 100 and enlarge a capacitance of the multilayer ceramic capacitor 100, it is demanded that a thickness of the dielectric layer 11 is reduced and a material having a high dielectric constant (c) is used. However, when the thickness is reduced, reliability may be degraded because of insulation breakdown. A capacitance of the material having the high dielectric constant tends to secularly fluctuate. Therefore, it is difficult to achieve preferable aging characteristic. Accordingly, it is demanded that the dielectric layer 11 improves reliability and suppresses secular change.

When the dielectric layer 11 has $BaTiO_3$ of perovskite as a main component, it is possible to achieve high dielectric constant of the dielectric layer 11.

Next, a description will be given of improvement of reliability and suppression of secular change of the dielectric layer 11. The dielectric layer 11 is formed by baking raw material powder of which main component is $BaTiO_3$. The raw material powder is exposed to reductive atmosphere during the baking. Therefore, oxygen defect occurs in $BaTiO_3$. During operation of the multilayer ceramic capacitor 100, a voltage is repeatedly applied to the dielectric layer 11. In this case, the oxygen defect moves, and barrier may be broken. That is, the oxygen defect in $BaTiO_3$ is one of reasons of reliability degradation and secular change of the dielectric layer 11.

From the standpoint of ionization tendency, Mn (manganese) ion and V (vanadium) ion tend to be reduced, compared to Ti ion. And so, in the embodiment, the dielectric layer 11 includes at least one of Mn and V as a predetermined element for suppressing oxygen defect occurrence of $BaTiO_3$. In this case, the reduction of Ti ion is suppressed, and generation of oxygen defect caused by the reduction baking of $BaTiO_3$ is suppressed. Accordingly, it is possible to improve the reliability of the dielectric layer 11 and suppress the secular change of the dielectric layer 11.

However, an amount of Mn and V in $BaTiO_3$ is small, the suppression effect of the oxygen defect in $BaTiO_3$ is not achieved. And so, the amount of Mn and V in $BaTiO_3$ has a lower limit. On the other hand, when the amount of Mn and V in $BaTiO_3$ is large, Mn and V are solid-solved in $BaTiO_3$. In this case, because of defect dipole caused by the solid-solution, a deviation may occur between spontaneous polarization direction and defect dipole direction. Therefore, the secular change of dielectric constant may become larger. And so, the amount of Mn and V in $BaTiO_3$ has an upper limit.

The present inventors have discovered that suppression effect of oxygen defect in $BaTiO_3$ is achieved when an atomic concentration ratio of total amount of Mn and V in the dielectric layer 11 is 0.035% or more and 0.120% or less. The atomic concentration ratio is (Mn+V)/Ti. $BaTiO_3$ may include only one of Mn and V, because the total amount of Mn and V is 0.035% or more and 0.120% or less. In the embodiment, the total amount of Mn and V is noticed, because Mn and V have a common function having influence on both insulation characteristic and secular characteristic of capacitance.

It is possible to measure the concentration of Mn and V in the dielectric layer 11, by measuring atomic concentration of Mn and V on a presumption that Ti is 100%, with use of ICP (Inductive Coupled Plasma) measurement method. It is possible to measure concentrations of rare earth elements, Si, B, Mg or the like included in the dielectric layer 11 with the ICP measurement method on a presumption that Ti is 100%.

It is preferable that the atomic concentration ratio of the total amount of Mn and V is 0.04% or more and 0.1% or less. It is more preferable that the atomic concentration ratio of the total amount of Mn and V is 0.05% or more and 0.09% or less.

When $BaTiO_3$ includes a rare earth element in addition to at least one of Mn and V, the rare earth element is mainly replaced to Ba site and prejudiced influence of Mn and V on Ti site can be suppressed. Thereby, degradation of reliability of the dielectric layer 11 can be suppressed. It is preferable that at least one of Y, Dy, Tm, Ho, Tb. Yb and Er is used.

When the amount of the rare earth element is small, the suppression effect of reliability degradation of the dielectric layer 11 becomes smaller. And so, it is preferable that the amount of the rare earth element in $BaTiO_3$ has a lower limit. For example, it is preferable that an atomic concentration ratio of a rare earth element Re (Re/Ti) is 0.1% or more. On the other hand, when the amount of the rare earth element is large, the dielectric constant of the dielectric layer 11 may be degraded. And so, it is preferable that the amount of the rare earth element in $BaTiO_3$ has an upper limit. For example, it is preferable that the atomic concentration ratio of the rare earth element Re (Re/Ti) is 3.0% or less. "Re" does not indicate a specific rare earth element but is a generic name of rare earth elements.

It is preferable that Mn and V are diffused and dispersed in the dielectric layer 11. And so, it is preferable that the dielectric layer 11 includes at least one of Si (silicon) and B (boron). This is because Si oxide ($SiO_2$) and B oxide ($B_2O_3$) act as sintering additive of the dielectric layer 11 and achieve dense sintered phase of the dielectric layer 11.

From the standpoint of high dielectric constant, it is preferable that the dielectric layer 11 has a relative dielectric constant c that is equal to or more than 3000. It is preferable that the atomic concentration ratio (Mg/Ti) of Mg (magnesium) of the dielectric layer 11 is more than 0 and 0.1% or less. With the range of Mg, the dielectric layer 11 can maintain the reliability in a thin layer range from 0.5 μm to 0.9 μm. It is preferable that the concentration of Mg is zero. When the concentration of Mg is zero, the dielectric layer 11 can maintain the reliability in a thin layer range of 0.3 μm to 0.7 μm.

Figure 3:
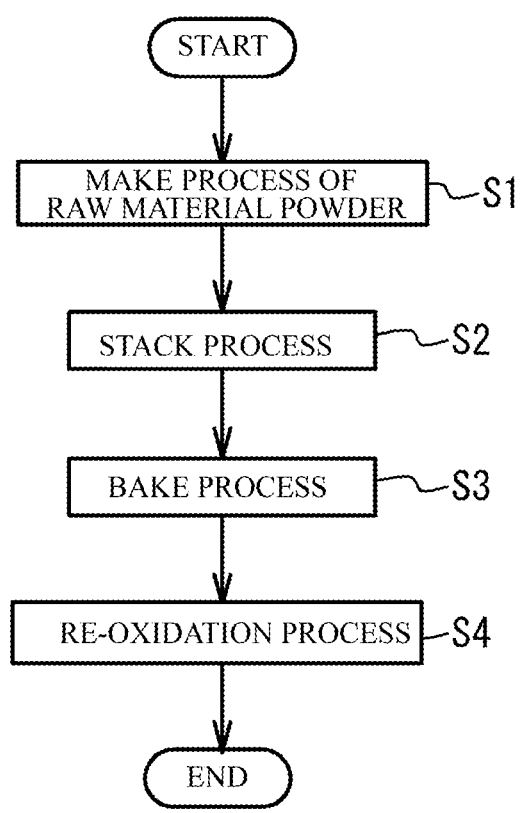
FIG. 3 illustrates a manufacturing method of a multilayer ceramic capacitor.

Next, a description will be given of a manufacturing method of the multilayer ceramic capacitor 100. FIG. 3 illustrates a manufacturing method of the multilayer ceramic capacitor 100.

(Make process of raw material powder) First, raw material powder for forming the dielectric layer 11 is prepared. Generally, Ba and Ti are included in the dielectric layer 11 in a sintered phase of grains of $BaTiO_3$. $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of $BaTiO_3$. For example, a solid-phase method, a sol-gel method, a hydrothermal method or the like can be used. The embodiment may use any of these methods.

Additive compound may be added to the resulting ceramic powder, in accordance with purposes. The additive compound may be an oxide of Mg, Mn, V, Cr or a rare earth element (Y, Dy, Tm, Ho, Tb, Yb, Sm, Eu, Gd and Er), or an oxide of Co, Li, B, Na, K and Si, or glass.

In the embodiment, it is preferable that $BaTiO_3$ grains are mixed with compound including additives and are calcined in a temperature range from 820 degrees C. to 1150 degrees C. Next, the resulting $BaTiO_3$ grains are wet-blended with additives, are dried and crushed. Thus, ceramic powder is obtained. For example, it is preferable that an average grain diameter of the resulting $BaTiO_3$ used for manufacturing the multilayer ceramic capacitor 100 is 50 nm to 150 nm from a viewpoint of thickness reduction of the dielectric layer 11. The grain diameter may be adjusted by crushing the resulting ceramic powder as needed. Alternatively, the grain diameter of the resulting ceramic power may be adjusted by combining the crushing and classifying.

(Stack Process) Next, a binder such as polyvinyl butyral (PVB) resin, an organic solvent such as ethanol or toluene, and a plasticizer such as dioctyl phthalate (DOP) are added to the resulting ceramic powder and wet-blended. With use of the resulting slurry, a strip-shaped dielectric green sheet with a thickness of 1.2 μm or less is coated on a base material by, for example, a die coater method or a doctor blade method, and then dried.

Then, a metal conductive paste including the organic binder is printed on the surface of the dielectric green sheet by screen printing or gravure printing to arrange patterns of the internal electrode layers. Thus, patterns of the internal electrode layers alternately extracted to the pair of the external electrodes are arranged. The metal of the metal conductive paste may be nickel. $BaTiO_3$ having an average grain diameter of 50 nm or less may be dispersed into the metal conductive paste, as a co-material.

Then, the dielectric green sheet on which the internal electrode layer pattern is printed is stamped into a predetermined size, and a predetermined number (for example, 200 to 500) of stamped dielectric green sheets are stacked while the base material is peeled so that the internal electrode layers 12 and the dielectric layers 11 are alternated with each other and the end edges of the internal electrode layers 12 are alternately exposed to both end faces in the length direction of the dielectric layer so as to be alternately led out to a pair of external electrodes of different polarizations.

Cover sheets, which are to be the cover layers 13, are stacked on the stacked green sheets and under the stacked sheets. The resulting compact is cut into a predetermined size (for example, 1.0 mm×0.5 mm). Thus, a compact of the multilayer chip 10 is obtained. After that, external electrodes may be thickly formed on both edge faces of the compact by sputtering.

(Bake process) The binder is removed from the resulting compact of the multilayer chip 10 in $N_2$ atmosphere of a temperature range of 250 degrees C. to 500 degrees C. After that, the compact is baked for ten minutes to 2 hours in a reductive atmosphere in a temperature range of 1100 degrees C. to 1300 degrees C. Thus, each compound of the dielectric green sheet is sintered and grown into grains. In this manner, it is possible to manufacture the multilayer ceramic capacitor 100 that has the multilayer chip 10 having the multilayer structure in which the sintered dielectric layers 11 and the sintered internal electrode layers 12 are alternately stacked and has the cover layers 13 formed as outermost layers of the multilayer chip 10 in the stack direction.

In the embodiment, a re-oxidizing process may be performed in $N_2$ gas atmosphere in a temperature range of 600 degrees C. to 1000 degrees C.

In the embodiment, the dielectric layer 11 includes $BaTiO_3$ as a main component and includes a rare earth element, and an atomic concentration ratio of total amount of Mn and V with respect to Ti is 0.035% to 0.120%. With the structure, occurrence of oxygen defect in $BaTiO_3$ can be suppressed. As a result, the degradation of reliability and the secular change of the dielectric layer 11 can be suppressed. That is, it is possible to provide a multilayer ceramic capacitor having a capacitance of which secular change is small and high reliability estimated by HALT test.

EXAMPLES

Multilayer ceramic capacitors were manufactured in accordance with the embodiments, and characteristic of the multilayer ceramic capacitors were measured.

Examples 1 to 84

The multilayer ceramic capacitors 100 were manufactured in accordance with the embodiment. Table 1 shows a common structure of examples 1 to 84 and comparative examples 1 to 36. The external electrodes 20 and 30 have a structure having a Cu portion of which thickness is 22 μm, a Ni portion formed on the Cu portion by plating of which thickness is 2 μm and a Sn portion formed on the Ni portion of which thickness is 6 μm.

TABLE 1

| | |
|---|---|
| Dimensions (mm) Length × Width × Height | 0.6 × 0.3 × 0.3 |
| Thickness of the dielectric layer | 0.7 μm |
| Number of dielectric layer | 250 layers |
| Thickness of the external electrode (including plating) | 30 μm |
| Relative dielectric constant | 3000 to 5500 |
| Average grain diameter | 100 nm to 300 nm |

In the examples 1 to 84, at least one of Mn and V was doped into the dielectric layer 11. Each added amount and total added amount of Mn and V are shown in FIG. 4 to FIG. 11. In the examples 1 to 84, the total of the atomic concentration ratios of Mn and V in the dielectric layer 11 was 0.035% or more and 0.120% or less. In FIG. 4 to FIG. 11, a column "range of Mn+V" is "within range" when the total of the atomic concentration ratios of Mn and V in the dielectric layer 11 was 0.035% or more and 0.120% or less. When the total was out of the range, "range of Mn+V" is "out of range". In the examples 1 to 10 and the comparative examples 1 to 10, the dielectric layer 11 included Ho of 0.5% (atomic concentration ratio) and did not include Mg. In the examples 11 to 20 and the comparative examples 11 to 20, the dielectric layer 11 included Ho of 1.0% (atomic concentration ratio) and did not include Mg. In the examples 21 to 30 and the comparative examples 21 to 30, the dielectric layer 11 included Ho of 2.8% (atomic concentration ratio) and did not include Mg. In the examples 31 to 40 and the comparative examples 31 to 32, the dielectric layer 11 included Ho of 0.5% (atomic concentration ratio) and included Mg of 0.09% (atomic concentration ratio). In the examples 41 to 50 and the comparative examples 33 to 34, the dielectric layer 11 included Ho of 1.0% (atomic concentration ratio) and included Mg of 0.09% (atomic concentration ratio) Mg. In the examples 51 to 60 and the comparative examples 35 to 36, the dielectric layer 11 included Ho of 2.8% (atomic concentration ratio) and included Mg of 0.09% (atomic concentration ratio). In the examples 61 to 76, the dielectric layer 11 included Dy. In the examples 77 to 84, the dielectric layer 11 included Ho and Dy.

In the comparative examples, the total of the atomic concentration ratios of Mn and V in the dielectric layer 11 was out of the range from 0.035% to 0.120%. Each added amount and total added amount of Mn and V are shown in FIG. 4 to FIG. 9. In FIG. 4 to FIG. 9, a column "range of Mn+V" is "out of range" when the total of the atomic concentration ratios of Mn and V in the dielectric layer 11 was out of the range from 0.035% to 0.120%.

The dielectric layers 11 of the examples 1 to 84 and the comparative examples 1 to 36 included Si oxide and B oxide as sintering additive. The atomic concentration ratio of Si in the dielectric layer 11 was 1.15%. The atomic concentration ratio of B in the dielectric layer 11 was 0.13%. Even if the sintering additive is not included, it is possible to achieve dense sintered phase by increasing the baking temperature or elongating the baking time.

In the examples 1 to 84 and the comparative examples 1 to 36, the atomic concentration ratios of Mn, V, Ho, Dy, Si, B and Mg were measured by an ICP measurement method by measuring the atomic concentration ratios of Mn, V, Ho, Dy, Si, B and Mg on a presumption that Ti is 100%.

Figure 12:
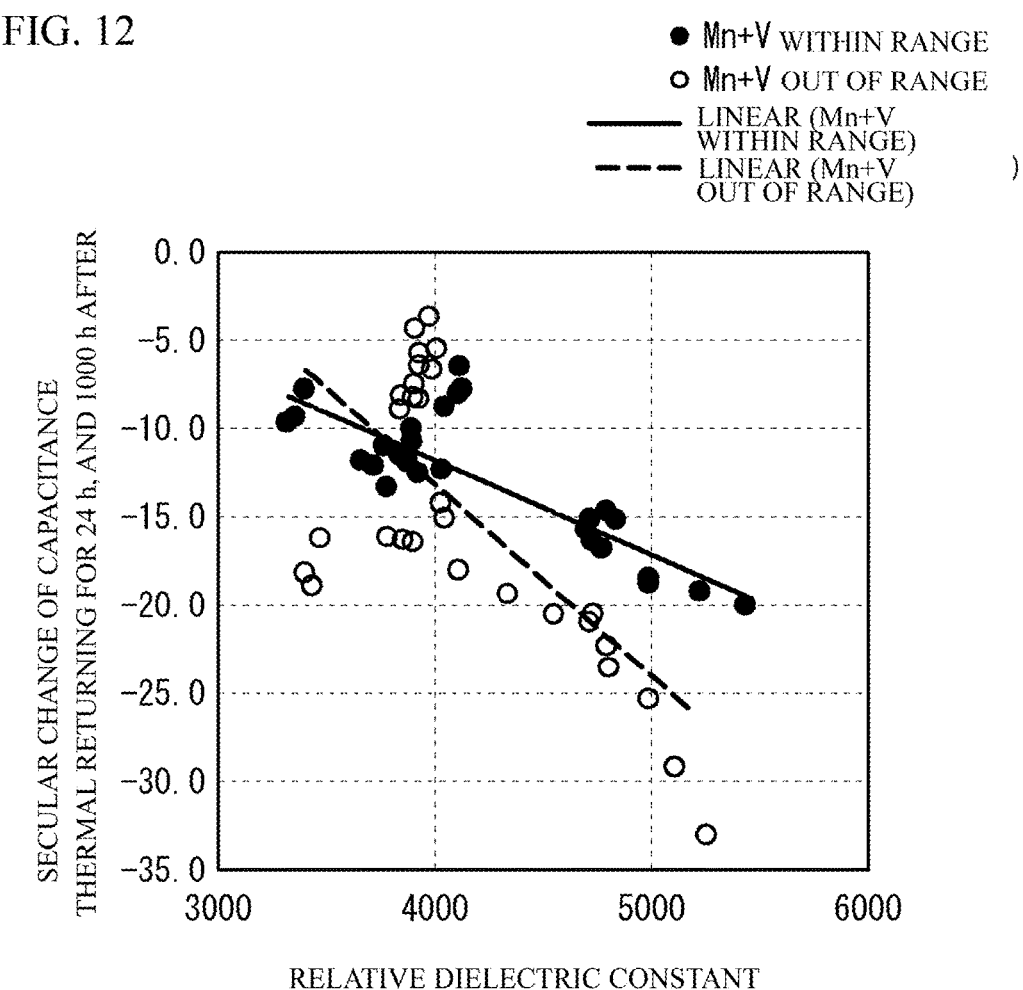
FIG. 12 illustrates results of no-load test.
Figure 13:
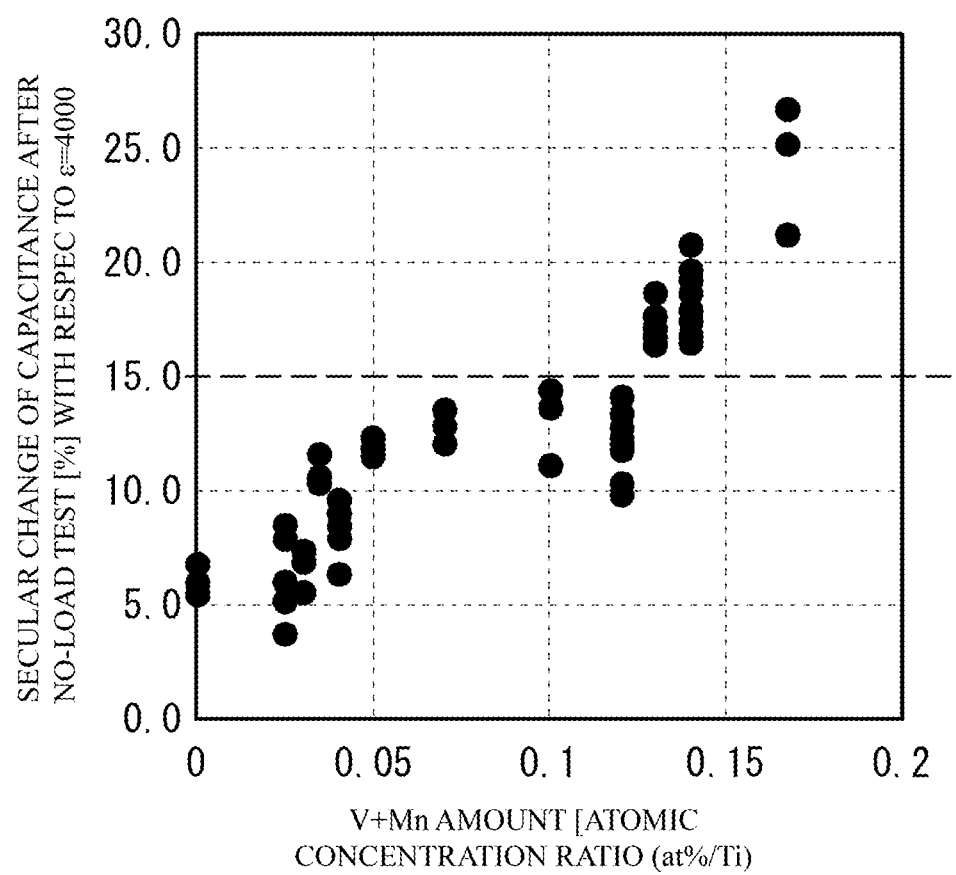
FIG. 13 illustrates results of no-load test.
Figure 14:
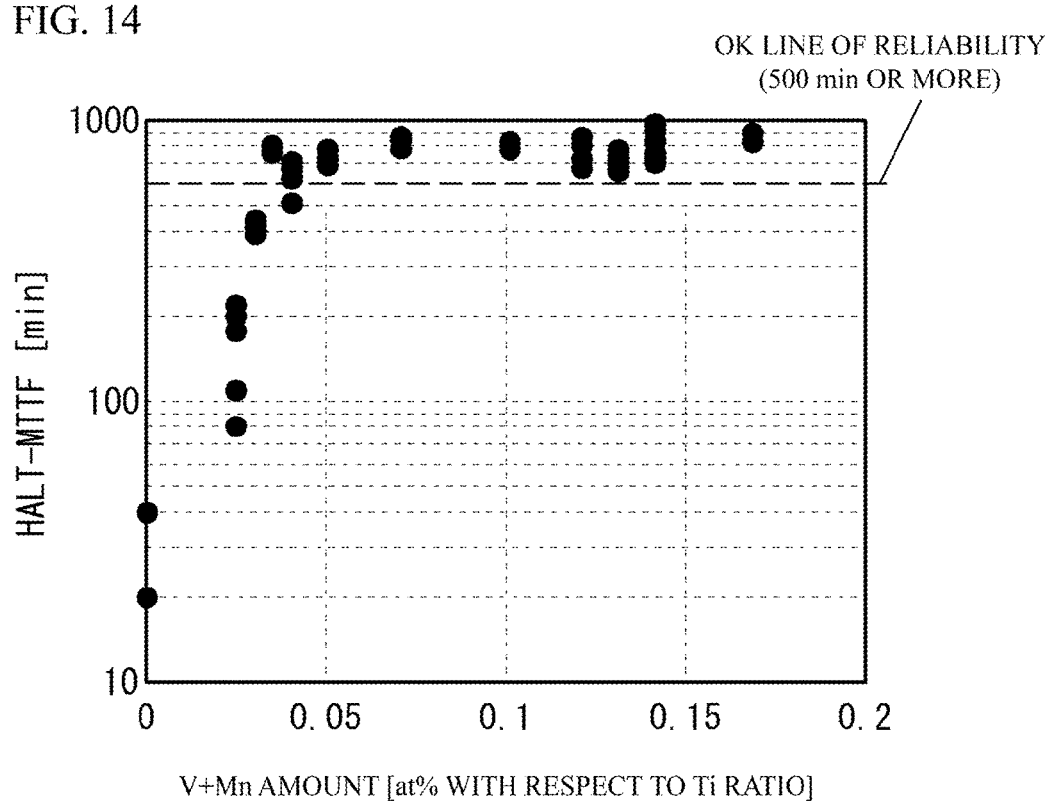
FIG. 14 illustrates results of HALT test.

The secular change of dielectric constant of the multilayer ceramic capacitors 100 of the examples 1 to 84 and the comparative examples 1 to 36 was measured by no-load test. The multilayer ceramic capacitors 100 were subjected to thermal returning for 24 hours. After 1000 hours after that, the relative dielectric constant was measured. FIG. 4 to FIG. 11 show the results. FIG. 12 illustrates plotted secular changes of the relative dielectric constant and the capacitance corresponding to "within Mn+V range" of the examples 1 to 30 and "out of range of Mn+V" of the comparative examples 1 to 30.

As illustrated in FIG. 4 to FIG. 12, the reduction of the relative dielectric constant was enlarged in the comparative examples 1 to 36, however the reduction of the relative dielectric constant was suppressed in the examples 1 to 84. This is because the atomic concentration ratio of the total amount of Mn and V in the dielectric layer 11 was 0.035% to 0.120%, thereby the oxygen defect of $BaTiO_3$ was suppressed, distortion of a crystal structure was suppressed, and the secular change of the dielectric constant was suppressed.

FIG. 4 to FIG. 11 and FIG. 13 illustrate the changing rate of the dielectric constant at $\in=4000$ in the measurement of the no-load test. When the changing rate of the dielectric constant at $\in=4000$ was 15% or less, it was determined as good (circle). As illustrated in FIG. 4 to FIG. 11 and FIG. 13, it was determined as bad (cross) in the comparative examples 1 to 4, 8, 10, 11 to 14, 18, 20, 21 to 24, 28, 30, 31, 33 and 35. However, it was determined as good (circle) in the examples 1 to 84.

Next, the HALT test was performed with respect to each multilayer ceramic capacitor 100 of the examples 1 to 84 and the comparative examples 1 to 36. In the HALT test, 12V was applied at a high temperature of 125 degrees C. It was determined as good (circle) when 500 min or more was achieved. As illustrated in FIG. 4 to FIG. 11 and FIG. 14, it was determined as bad (cross) in the comparative examples 5 to 7, 9, 15 to 17, 19, 25 to 27, 29, 32, 34 and 36. However, it was determined as good (circle) in the examples 1 to 84. This is because the atomic concentration ratio of the total amount of Mn and V in the dielectric layer 11 was 0.035% or more, and the oxygen defect of $BaTiO_3$ was suppressed.

It was totally determined as good (circle) when it was determined as good (circle) in both the no-load test and the HALT test. As illustrated in FIG. 4 to FIG. 11, it was totally determined as bad (cross) in the comparative examples 1 to 36. However, it was totally determined as good (circle) in the examples 1 to 84. As illustrated in FIG. 4 to FIG. 11, when the total amount of the atomic concentration ratio of Mn and V was 0.035% to 0.120% in the dielectric layer 11, it was totally determined as good (circle).

Although the embodiments of the present invention have been described in detail, it is to be understood that the various change, substitutions, and alterations could be made hereto without departing from the spirit and scope of the invention.

What is claimed is:

1. A multilayer ceramic capacitor comprising:
   a multilayer structure in which each of a plurality of ceramic dielectric layers and each of a plurality of internal electrodes are alternately stacked and are alternately exposed to two edge faces of the multilayer structure;
   a first external electrode that is coupled to one of the two edge faces ; and
   a second external electrode that is coupled to the other of the two edge faces,
   wherein:
   a main component of the plurality of ceramic dielectric layers is $BaTiO_3$;
   the plurality of ceramic dielectric layers include a rare earth element; and
   an atomic concentration ratio of a total amount of Mn and V with respect to Ti in the plurality of ceramic dielectric layers is 0.035% or more and 0.120% or less.

2. The multilayer ceramic capacitor as claimed in claim 1, wherein an atomic concentration ratio of the rare earth element with respect to Ti is 0.1% to 3.0% in the plurality of ceramic dielectric layers.

3. The multilayer ceramic capacitor as claimed in claim 1, wherein the rare earth element is at least one of Y, Dy, Tm, Ho, Tb, Yb, Sm, Eu, Gd and Er.

4. The multilayer ceramic capacitor as claimed in claim 2, wherein the rare earth element is at least one of Y, Dy, Tm, Ho, Tb, Yb, Sm, Eu, Gd and Er.

5. The multilayer ceramic capacitor as claimed in claim 1, wherein the plurality of ceramic dielectric layers include Mg of which an atomic concentration ratio with respect to Ti is more than 0% and less than 0.1%.

6. The multilayer ceramic capacitor as claimed in claim 2, wherein the plurality of ceramic dielectric layers include Mg of which an atomic concentration ratio with respect to Ti is more than 0% and less than 0.1%.

7. The multilayer ceramic capacitor as claimed in claim 3, wherein the plurality of ceramic dielectric layers include Mg of which an atomic concentration ratio with respect to Ti is more than 0% and less than 0.1%.

8. The multilayer ceramic capacitor as claimed in claim 4, wherein the plurality of ceramic dielectric layers include Mg of which an atomic concentration ratio with respect to Ti is more than 0% and less than 0.1%.

9. The multilayer ceramic capacitor as claimed in claim 1, wherein the plurality of ceramic dielectric layers do not include Mg.

10. The multilayer ceramic capacitor as claimed in claim 2, wherein the plurality of ceramic dielectric layers do not include Mg.

11. The multilayer ceramic capacitor as claimed in claim 3, wherein the plurality of ceramic dielectric layers do not include Mg.

12. The multilayer ceramic capacitor as claimed in claim 4, wherein the plurality of ceramic dielectric layers do not include Mg.

13. The multilayer ceramic capacitor as claimed in claim 1, wherein the plurality of ceramic dielectric layers include at least one of Si and B.

14. The multilayer ceramic capacitor as claimed in claim 5, wherein the plurality of ceramic dielectric layers include at least one of Si and B.

15. The multilayer ceramic capacitor as claimed in claim 9, wherein the plurality of ceramic dielectric layers include at least one of Si and B.

16. The multilayer ceramic capacitor as claimed in claim 1, wherein a relative dielectric constant of the plurality of ceramic dielectric layers is 3000 or more.

17. The multilayer ceramic capacitor as claimed in claim 5, wherein a relative dielectric constant of the plurality of ceramic dielectric layers is 3000 or more.

18. The multilayer ceramic capacitor as claimed in claim 9, wherein a relative dielectric constant of the plurality of ceramic dielectric layers is 3000 or more.

19. A multilayer ceramic capacitor comprising:

a multilayer structure in which each of a plurality of ceramic dielectric layers and each of a plurality of internal electrodes are alternately stacked and are alternately exposed to two edge faces of the multilayer structure;

a first external electrode that is coupled to one of the two edge faces; and a second external electrode that is coupled to the other of the two edge faces, wherein:

a main component of the plurality of ceramic dielectric layers is $BaTiO_3$;

the plurality of ceramic dielectric layers include a rare earth element;

an atomic concentration ratio of a total amount of Mn and V with respect to Ti in the plurality of ceramic dielectric layers is 0.035% or more and 0.120% or less; and the plurality of ceramic dielectric layers do not include Mg.

* * * * *